K. EBERLE
COVERS FOR COFFEE-POTS, TEA-KETTLES. &c.

No. 180,469. Patented Aug. 1, 1876.

Witnesses:
E. M. Squires
Wesley Miller

Inventor:
Karl Eberle
Per G. Stackpole,
Atty.

UNITED STATES PATENT OFFICE.

KARL EBERLE, OF NEWARK, NEW JERSEY, ASSIGNOR TO L. G. DALBY, OF BROOKLYN, NEW YORK.

IMPROVEMENT IN COVERS FOR COFFEE-POTS, TEA-KETTLES, &c.

Specification forming part of Letters Patent No. 180,469, dated August 1, 1876; application filed November 18, 1874.

*To all whom it may concern:*

Be it known that I, KARL EBERLE, of the city of Newark, in the county of Essex and State of New Jersey, have invented an Improved Sheet-Metal Cover for a Tea-Kettle, Coffee-Pot, or any other vessel for which it may be adapted, of which the following is a specification:

My invention relates to a new article of manufacture, consisting in a cover for vessels, utensils, and other articles, its object being to form a light, strong, durable, and highly-ornamental cover, with a suitable knob or handle, complete in one piece.

Hitherto it has been impossible to construct such vessels in one piece, with a knob or handle with sufficient "undercut" to be grasped with facility, owing to the impossibility of removing the "chuck" or form, which is necessary in spinning up the metal of which such knob is composed, when the portion forming the stem is sufficiently contracted to form said undercut. Sheet-metal covers for vessels and other utensils for this reason have heretofore been formed without the knobs, which are afterward attached by soldering, riveting, or otherwise. As thus constructed the handles are extremely liable to be melted, broken off, or pulled, the metal rendering the article inconvenient to handle and difficult to repair.

My invention is designed to obviate these defects; and consists in a cover formed of sheet metal, spun or stamped into any suitable shape, with a shoulder and rim to fit the mouth of the vessel, and a knob or handle for lifting, deeply undercut, for facility of handling, complete in one piece.

Figure 1:
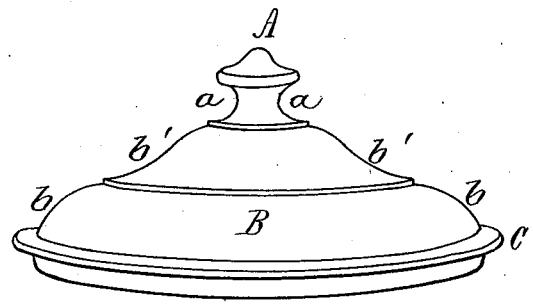
Figure 2:
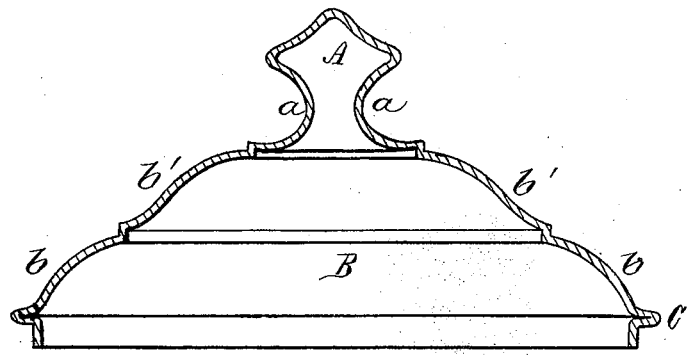

In the drawing, Figure 1 represents a perspective view of my improved cover, and Fig. 2 is a sectional view of the same.

The letter A represents the knob or handle with a narrow or contracted neck, a, forming a deep undercut for the purpose of facilitating handling. B represents the body of the cover, formed with a rim and shoulder, C, to fit the mouth of the vessel. Said body is dome-shaped, and formed with a series of ornamental curves, b and b', between the rim C and knob A.

The cover is constructed, as usual, by spinning or stamping up the metal over a suitable chuck or form. The form or chuck for shaping the body B and rim C is of the usual construction.

By this means I produce an article that it has been utterly impossible to produce hitherto by means of the ordinary tools and appliances known to sheet-metal workers; and

What I claim, therefore, is—

A new article of manufacture, consisting in a cover of sheet metal, constructed, as described, with a shoulder and rim to fit the mouth of the vessel, and a knob or handle for lifting, deeply undercut to facilitate handling, the whole complete in one piece, substantially as described.

KARL EBERLE.

Witnesses:
LEVI J. SQUIRE,
JOHN GILBERT.